US009833959B2

(12) United States Patent
Heckenberger et al.

(10) Patent No.: US 9,833,959 B2
(45) Date of Patent: Dec. 5, 2017

(54) FRAME FOR AN ELECTROCHEMICAL ENERGY-STORAGE UNIT

(75) Inventors: Thomas Heckenberger, Fentange (LU); Fan Jin, Stuttgart (DE); Alexandra Schnaars, Marbach am Neckar (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 1120 days.

(21) Appl. No.: 13/989,474

(22) PCT Filed: Nov. 23, 2011

(86) PCT No.: PCT/EP2011/070876
§ 371 (c)(1),
(2), (4) Date: Aug. 12, 2013

(87) PCT Pub. No.: WO2012/069561
PCT Pub. Date: May 31, 2012

(65) Prior Publication Data
US 2013/0313754 A1    Nov. 28, 2013

(30) Foreign Application Priority Data

Nov. 24, 2010 (DE) .................. 10 2010 061 865

(51) Int. Cl.
*B29D 99/00* (2010.01)
*H01M 2/02* (2006.01)
(Continued)

(52) U.S. Cl.
CPC ........ *B29D 99/006* (2013.01); *H01M 2/0262* (2013.01); *H01M 2/0277* (2013.01);
(Continued)

(58) Field of Classification Search
CPC .............. B29C 45/0001; B29D 99/006; B29K 2995/0007; B29K 2995/0013;
(Continued)

(56) References Cited

U.S. PATENT DOCUMENTS 5,800,945 A    9/1998    Grivel et al.
7,709,123 B2    5/2010    Kawabata et al.
(Continued)

FOREIGN PATENT DOCUMENTS

DE    24 26 142 A1    12/1975
DE    40 41 125 A1    7/1992
(Continued)

OTHER PUBLICATIONS

International Search Report, PCT/EP2011/070876, dated Mar. 1, 2012, 3 pgs.
(Continued)

*Primary Examiner* — Robert J Grun
(74) *Attorney, Agent, or Firm* — Paul D. Strain, Esq.; Strain & Strain PLLC

(57) ABSTRACT

The present invention relates to a process for producing frame elements for a frame for holding and arranging electrochemical cells in an electrochemical energy-storage unit. The present invention also relates to the use of certain plastics mixtures for producing said frame elements. The frame elements or frames of the invention are particularly preferably used in electrochemical energy-storage units with high power density. Electrochemical energy-storage units of this type with high power density are more particularly used for the operation of motor vehicles with electrical drive, for example in vehicles which are driven on the "hybrid" principle (electrical drive and internal combustion engine), and are also preferably used for exclusively or primarily electrically operated vehicles. It is preferable here to use, as electrochemical energy-storage units with high power density, lithium-ion batteries or lithium-polymer batteries.

16 Claims, 2 Drawing Sheets

(51) Int. Cl.
   *H01M 2/10*      (2006.01)
   *H01M 10/04*     (2006.01)
   *H01M 10/0525*   (2010.01)
   *B29C 45/00*     (2006.01)

(52) U.S. Cl.
   CPC ......... *H01M 2/1072* (2013.01); *H01M 10/04* (2013.01); *H01M 10/0525* (2013.01); *B29C 45/0001* (2013.01); *B29K 2995/0007* (2013.01); *B29K 2995/0013* (2013.01); *Y02E 60/122* (2013.01); *Y02T 10/7011* (2013.01)

(58) Field of Classification Search
   CPC ............ H01M 10/04; H01M 10/0525; H01M 2/0262; H01M 2/0277; H01M 2/1072; Y02E 60/122; Y02T 10/7011
   See application file for complete search history.

(56) References Cited

U.S. PATENT DOCUMENTS

| | | | | |
|---|---|---|---|---|
| 2004/0028855 | A1* | 2/2004 | Masuki | B29C 45/37 428/35.7 |
| 2005/0170238 | A1* | 8/2005 | Abu-Isa | H01M 2/0242 429/82 |
| 2005/0233206 | A1* | 10/2005 | Puttaiah | H01M 2/024 429/120 |
| 2007/0037053 | A1* | 2/2007 | Anantharaman | H01M 2/02 429/176 |
| 2009/0269659 | A1* | 10/2009 | Levasalmi | B29C 45/0001 429/163 |
| 2012/0208059 | A1* | 8/2012 | Kohlberger | H01M 2/024 429/100 |

FOREIGN PATENT DOCUMENTS

| | | |
|---|---|---|
| DE | 695 14 428 T2 | 5/2000 |
| DE | 603 03 139 T2 | 8/2006 |
| DE | 10 2007 037 416 A1 | 2/2009 |
| DE | 11 2007 000 860 B4 | 8/2010 |
| DE | 10 2009 037 063 A1 | 2/2011 |
| DE | 20 2010 016 259 U1 | 2/2011 |
| EP | 1 717 882 B1 | 1/2011 |

OTHER PUBLICATIONS

German Search Report, DE 10 2010 061 865.9, dated Sep. 22, 2011, 8 pgs.

\* cited by examiner

FRAME FOR AN ELECTROCHEMICAL ENERGY-STORAGE UNIT

CROSS-REFERENCE TO RELATED PATENT APPLICATIONS

This application is a National Stage of International Application No. PCT/EP2011/070876, filed Nov. 23, 2011, which is based upon and claims the benefit of priority from prior German Patent Application No. 10 2010 061 865.9, filed Nov. 24, 2010, the entire contents of all of which are incorporated herein by reference in their entirety.

The present invention relates to a process for the manufacture of frame elements for a frame for holding and arranging electrochemical cells in an electrochemical energy storage unit. The present invention also relates to the deployment of specific polymer blends in the manufacture of these frame elements.

Particularly preferred are the frame elements according to the present invention, or the frames in electrochemical energy storage units with high power density. Such electrochemical energy storage units with high power density are used in particular for the operation of electrically driven vehicles, for example in vehicles driven using the "hybrid" principle (electrical drive and internal combustion engine), but also for exclusively or primarily electrically operated vehicles ("electric vehicles", "EV"). For these, preferably lithium-ion batteries or lithium-polymer batteries are used as electrochemical energy storage units with high power density.

Electrochemical energy storage units with high power density pose a number of special requirements, in particular relating to the management or the disposal of the heat produced during the operation of the energy storage unit, which can considerably exceed that produced in conventional batteries. Furthermore, in the preferred deployment of such energy storage units for the operation of vehicles, within an energy storage unit (battery) a particularly large number of electrochemical cells have to be arranged in a space-saving and weight-saving manner in a spatially restricted situation. In addition, the shape of this arrangement has to remain stable over the entire operating life.

Electrochemical energy storage units (also called "batteries") preferably include a large number of electrochemical cells, which are physically separate units, with these units including cell stacks in a housing. These cell stacks include at least two electrodes each containing at least one electrochemically active material. Typically, leads protrude from this housing for the transmission of electrical current (for charging or discharging the cell). In an electrochemical energy storage unit ("battery"), all these cells are electrically connected in series. Preferably, these electrochemical cells are connected stably with respect to the environment and to each other in a frame with frame elements.

Within the context of the present invention, these electrochemical cells, which make up the electrochemical energy storage unit, are preferably flat cells, i.e. they have one length dimension (thickness), which is at least less than half, but preferably less than a quarter, and even more preferably less than an eighth of the other two length dimensions (height and width). Such flat cells are preferably in the shape of cuboids and therefore not of a cylindrical shape.

In DE 10 2007 037 416, such a structure for an energy storage unit containing a large number of stacked flat cells in a frame is in principle known: the electrochemical energy storage unit contains a large number of flat cells which in turn contain at least two connection leads and a covering having a first and a second face and a first and a second flat side. Here the large number of flat cells are stacked up with the flat sides essentially parallel, wherein the leads protrude at least in part from the first and/or second face and at least one lead of a first flat cell is electrically connected to at least one lead of a second flat cell via at least one connector element. Between the flat sides of neighboring flat cells, a frame is located. According to DE 10 2007 037 416, this frame should preferably be made from a plastic and be designed in such a way, with the deployment of positioning and/or connection aids, that the number of parts to be positioned during assembly is reduced.

While therefore a frame for the parallel or stacked arrangement of a large number of electrochemical cells is in principle already known from the state of technology, the materials for such frames, if such materials are mentioned at all, are not suitable or optimized for use in electrochemical energy units with high power density.

One task of the present invention is, therefore, to provide a method for the manufacture of frame elements for frames of electrochemical energy units with high power density, or to provide materials which are particularly suitable for such manufacturing methods.

These and other tasks are fulfilled by means of a method for the manufacture of frame elements for frames of electrochemical energy storage units, in particular those with high power density, comprising at least the following steps:

(i) provision of at least one homopolymer or at least one copolymer or mixtures of these, in particular polymer blends;

(ii) addition, in order to obtain a polymer blend, of at least one additive selected from the group comprising: softeners, flame retardants, processing aids, additives for elastomer modification;

(iii) injection molding of the polymer mixture obtained to produce a frame element.

Here, the polymer blend comprising at least one homopolymer or at least one copolymer or a mixture of these, which is processed into a frame element or frame, is suitable for injection molding.

The present invention also refers to the use of a polymer blend comprising at least one homopolymer or at least one copolymer or a mixture of these, in particular a polymer blend, and further comprising at least one additive selected from the group containing: softeners, flame retardants, processing aids, or additives for elastomer modification, in a frame element for frames of electrochemical energy storage units, in particular those with a high power density, whereby said frame element is obtained by injection molding.

Injection molding methods are, according to the state of technology, particularly suitable for this application compared to other methods, as these processes are economically advantageous and allow the processing of such polymer materials which fulfill the above requirements for frame elements in electrochemical energy storage units with high power density.

In the sense of the present invention, the polymer blend obtained in this way comprising at least one homopolymer or at least one copolymer or a mixture of these, which is processed into a frame element or a frame, or the frame element itself, is essentially electrically insulating, i.e. it does not act as an electrically conducting material. Preferably, the specific resistance (also: specific flow resistance) of the obtained frame element (plastic molding) is more than 1 $\Omega m$ (at 20° C.), preferably more than $10^5$ $\Omega m$ (at 20° C.), and even more preferably more than $10^{10}$ $\Omega m$ (at 20° C.), even more preferably more than $10^{15}$ Ωm (at 20° C.), and most preferably more than $10^{20}$ Ωm (at 20° C.). For example, the specific resistance of PET, which is a preferred material in the sense of this invention, is $10^{20}$ Ωm (at 20° C.). The measurement of the specific resistance or the specific flow resistance is well known to experts in the field and is, for example, described in DIN 53482.

Here, in the sense of the present invention, it is particularly preferred if the obtained polymer blend or the frame element (plastic molding) is not only a bad conductor of electricity or an insulator, but is at the same time a material able to conduct heat well or very well. Here, a heat conductance (or heat conductance coefficient, specific heat conductance or thermal conductivity) for the obtained frame element (plastic molding) of above 0.1 W/(m K), preferably of above 0.2 W/(m K), even more preferably of above 0.5 W/(m K), and particularly preferably of above 1 W/(m K) is to be preferred. The heat conductance of materials, in particular of polymers, is determined in conformity with DIN 53612 and DIN 52613.

Preferably, the polymer blend containing at least one homopolymer or one copolymer or a mixture of these, which is processed into a frame element or a frame, is a flame retardant plastic, because the electrochemical energy storage unit is accommodated in a vehicle and can potentially make contact with other flammable materials. Furthermore, the issue of flammability is important in particular for electrochemical energy stores with high power density, because these can contain chemically reactive components, such as flammable solvents or metal ions in unstable oxidation levels, as is the case for lithium-ion batteries. In particular, no flames or soot should form on the frame elements.

Therefore the polymer blend containing at least one homopolymer or at least one copolymer or a mixture of these, which is processed into a frame element or frame, is a material with a flammability rating of V0 and preferably does not include halogen-containing or nitrate-containing flame retardants.

Preferably, the polymer blend containing at least one homopolymer or at least one copolymer or a mixture of these, which is processed into a frame element or frame, is suitable for riveting. This is advantageous particularly because the contact rail in the electrochemical energy store is preferably hot riveted to the frame. To do this, the temperature of the plastic molding made from the polymer blend (here frame element) should have a softening temperature suitable for hot riveting.

Furthermore, the plastic blend comprising at least one homopolymer or at least one copolymer or a mixture of these, which is processed to a frame element or a frame, should only show a small degree of relaxation. This allows the contact pressure between the contact rail and the heat conductor foil to be maintained as constant as possible.

Preferably, at least one homopolymer or at least one copolymer or the blend of these, which is processed using the method according to the invention, will result in a frame element which during a continuous thermal load under operating conditions (continuous temperature −40° C. to +100° C., preferably −30° C. to +50° C.) will remain adequately dimensionally stable over many weeks, but preferably many months.

Preferably the HDT/B value of the frame element according to the invention (plastic molding) will lie between 50° C. and 200° C., preferably between 80° C. and 200° C. (ISO 75).

Particularly preferred in the sense of the present invention is if the frame element according to the invention (plastic molding) is at least somewhat elastic, i.e. modified with an elastomer, as this allows a particularly favorable connection of the frame elements to each other (to form the frame), for example by means of (snap)hook connections.

At least one homopolymer is preferably selected from the group comprising: polyamide (PA), thermoplastic polyurethane (PU), polyester (preferably polyethylene terephthalate PET), polyoxymethylene (POM), polyphenylene oxide (PPO), polyphenylene sulfide (PPS), polyimide (PI) or polybutylene terephthalate (PBT).

At least one copolymer is preferably selected from the group comprising: PA66/6 or PP copolymers, PA 66/6 copolymers being the state of technology for other applications and in principle produced by means of known methods. For example, a PA66/6 copolymer can be obtained by polycondensation by splitting off water. PA66/6 copolymers are particularly preferred for the methods and applications of the invention.

The available material class of "PA66/6 copolymers" should preferably include all of those copolymers in which the polyamide is polymerized by simultaneous polycondensation of PA66 and PA6 blocks. The proportion of the PA66 blocks is preferably in the range of 10% to 80% by weight, more preferably 20% to 60% by weight, even more preferably 20% to 40% by weight, most preferably 25% to 35% by weight. By copolymerization, the polyamide obtains improved flow properties and improved processing properties. Furthermore, this copolymerization results in an improvement in the toughness compared to pure polyamide.

Other preferred PA material types for the manufacture of the frame elements are listed in the table below.

| Designation | Trade name | Composition |
| --- | --- | --- |
| PA 6/12 | Grilon ® C | 80/20 |
| PA 6/12 | Grilon ® C | 50/50 |
| PA 66/6 | Ultramid ® C35 | 85/15 |
| PA 66/6 | Ultramid C3 | 90/10 |
| PA 66/610 | Grilon ® XE 3303 | 50/50 |
| PA 12/6/66 | Griltex ® | 12/6/66 |

Preferred polymer blends are mixtures of PC, PP, PBT and PET with the elastomeric phase toughened, preferably compounded by means of reactive extrusion.

The frames and frame elements in the present invention are preferably used for electrochemical energy storage units with high power density, particularly preferably for lithium-ion batteries or lithium-polymer batteries.

The electrochemical energy storage units according to the present invention include preferably a large number of electrochemical cells in physically separated units, with these units including cell stacks inside a housing. These cell stacks include at least two electrodes, with each including at least one electrochemically active material. Furthermore, preferably leads protrude from this housing which are used for carrying the electric current.

Preferably, the large number of electrochemical cells in the electrochemical energy storage units according to the present invention are electrically connected in series. In the sense of the present invention, these electrochemical cells are fixed in one position both with respect to each other and with the environment. To achieve this, an electrochemical energy storage unit preferably contains more than 10 electrochemical cells, more preferably more than 20 electrochemical cells, even more preferably more than 30 electrochemical cells, even more preferably more than 40 electrochemical cells.

Within the outline of the present invention, these electrochemical cells forming the electrochemical energy storage unit are preferably flat cells, i.e. have one length dimension (thickness) which is at least less than half, preferably less than a quarter, even more preferably less than an eighth of the other length dimensions (height and width). Such flat cells are preferably cuboid-shaped and not cylindrical or of a cylindrical geometry.

The electrochemical energy storage unit of the present invention preferably has a high power density, preferably of more than 100 W/kg, more preferably of more than 300 W/kg, even more preferably of more than 1000 W/kg, and particularly preferably of more than 2000 W/kg (each provided for at least 20 seconds).

The electrochemical energy storage unit in which the frame or frame elements according to the present invention are used preferably has the following structure: Every individual electrochemical cell, preferably flat cell, is held in a separate frame element (plastic frame or plastic molding produced in conformity with the method according to the invention) and in particular on the sides (faces) protected by said frame elements against mechanical damage.

A large number of frame elements with an associated electrochemical cell, preferably a flat cell, is preferably stacked in such a way that 10 or more, preferably 20 or more, more preferably 30 or more, more preferably 40 or more of such frame elements with the associated electrochemical cell, preferably flat cell, are present side by side in physical contact on the longitudinal sides ("planar side") and not on the face side/"face".

Preferably, here two neighboring frame elements (with their associated electrochemical cell) are connected by means of at least one positioner and/or connector ("cell connector"). More preferably, every frame element, which is preferably essentially rectangular, should have on at least two corners, but preferably four corners, a positioner and/or connector. This allows precise positioning and/or connection of a construction unit (frame element with electrochemical cell) to a neighboring construction unit (including also a frame unit with an electrochemical cell).

To achieve this, the positioners and/or connectors are preferably in the shape of pins, hooks, locking catches, snap hooks or clips. With regard to the connection of the frame elements in the electrochemical energy storage unit, reference is made to DE 10 2007 037 416, the entire content of which should also be included in this patent application.

In a preferred embodiment of the frame, including a large number of connected frame elements, all connected frame elements are in effective contact with a cooling plate on their upper face via a thermally conducting film. The positioners and/or connectors ("cell connectors") are used in this embodiment at the same time as contact bars. The thermally conducting film for this is electrically insulating, i.e. it has a high specific electrical resistivity, preferably in the higher ranges of the figures already revealed with regard to the frame elements. In addition, the thermally conducting film should have a high thermal conductivity, also in the same range of figures already indicated with regard to the frame elements.

In a preferred embodiment of the present invention, an elastomer-modified polyamide is used as the at least one homopolymer or the at least one copolymer or the mixture of these.

By means of softeners of a similar polar structure to the polymer, it is possible to make the basic polymer of the polymer blend more flexible. The larger elongation and increased notch impact strength moves these materials close to the thermoplastic polyamide elastomers of similar hardness.

In order to connect the typical elastomer properties of vulcanized rubbers with the easy processability of the thermoplastic polymers, it is preferred to use thermoplastic elastomers based on polyamides for the method according to this invention for the manufacture of the frame elements. As the constructional materials, these, as melts, fulfill the requirement for particularly easy processing of the product.

In a preferred embodiment of the present invention, a block copolymer is used as the at least one homopolymer or at least one copolymer or the mixture of these. Block copolymers include "hard" and "soft" segments alternating within the polymer chain. Without being tied to one specific theory or mechanism, it is assumed on the basis of this that the elastomer properties in this embodiment are achieved by an interaction of the chains in such a way that the "hard" segments form aggregated areas and have the effect of physical crosslinks within the amorphous matrix (in the case of the PA elastomers from hydrogen bridges). These physical crosslinks allow thermoplastic processing and result, after solidification of the polymer blend, in an elastomer behavior.

The preferred embodiment of the plastic blend according to this invention in the form of elastomers with a high tensile strength is preferably achieved by having more than two hard segments available for each block copolymer. An example of such thermoplastic PA elastomers is Vestamid E developed by Hüls AG.

Blends (or polymer alloys) of at least one polyamide with at least one other polyamide are particularly preferred in the sense of the present invention.

In the sense of the present invention, the preferred blends from at least two chemically different polyamides are: PA6/PA66 blends [preferably with 10 to 40% PA66, more preferably 25 to 35%], PA6/PA66/PA12 tri-blends, PA6/PA1010 blends, PA6/PA12 blends or PA1010/PA12 blends.

Blends of at least one polyamide with at least one other polymer are preferred in the sense of the present invention, in particular mixtures of polyamides (PA) with polyolefins. PA/polyolefin blends are distinguished compared to pure PA by a 3-fold to 5-fold increase for the impact toughness and a reduction of the water absorption to a third. With these blends, unsaturated acid-containing adhesion promoters are preferably used. For this, the following are particularly preferred:

PA6/PE blends with the polyethylene component preferably being HDPE (high density polyolefin), LDPE (low density polyolefin), as well as LLDPE (low density linear polyethylene), preferably in weight ratios of 5 to 25% PA6, preferably 15 to 20% PA.

Blends of PA6 and/or PA12 and/or PA66 with PPE (polyphenylene ether, poly(oxy-2,6-dimethyl-1,4-phenylene), PPO), as well as blends which absorb particularly small amounts of moisture and which are therefore more dimensionally stable; preferred is the blend ratio PA66/PPO in percentage by weight, 5 to 20% PPO, preferably 5 to 10%;

PA/ABS (acrylonitrile butadiene styrene copolymer) blends; these offer, compared to pure PA, an increased impact strength, hardness, resistance to arcing, and rigidity; the preferred blends are PA6/ABS blend (preferably 15-20% ABS) as well as PA1010/ABS blends;

PA6/PPS (polyphenylene sulfide) blends;

PET (polyethylene terephthalate)/PA6 blend (preferably with 10 to 40% PA6, more preferably 15 to 25%).

In the sense of the present invention, blends based on polyamides have good mechanical properties, such as high wear resistance, good corrosion resistance, easy processability, good dimensional stability under heat, high continuous operating temperature, lower water absorption (as for PA homopolymers), good resistance to chemicals, low diffusion and good electrical insulation behavior.

In addition to the above-listed PA polymer blends, the use of PC (polycarbonate) polymer blends is also preferred. Of these, the following polymer blends are particularly preferred: PC/ABS blend, preferably with 5 to 30% ABS, more preferred with 10 to 20% [with preferably a ratio of AN (acrylonitrile) in the ABS between 6 and 30%, preferably between 20 and 25% AN]. The % figures refer, as they do everywhere in the text (unless explicitly stated otherwise), to percentage by weight.

These blends have, among others, the following advantages: increased resistance to stress cracking, increased notch impact strength, high dimensional stability under heat, good mechanical properties and low price. In addition, PC/ABS blends have advantageous rheological properties which make processing easier as well as low molding shrinkage and low absorption of humidity.

The addition of EVA (ethylene vinyl acetate) to a PC/PE blend or PC/PET blend (with 3 to 30%, but preferably 5 to 10% PET) results in an improvement in the weld seam strength and is therefore particularly preferred.

Other preferred PC blends are PC/PS blends (with 3 to 20%, preferably 5 to 10%), PC/POM blends (5 to 20% POM, preferably 5 to 10%), PC/polyolefin blends [e.g. PC/PP blend, PC/PE blend with 5 to 25% polyolefin, preferred polyolefins for this are: LLDPE (linear low density polyethylene) and LDPE (low density polyethylene)], PC/PE/EVA tri-blends (with 1 to 5% EVA), PC/PMMA blends (with 5 to 30% PMMA (polymethyl methacrylate), preferably 10 to 20%) as well as PC/TPU blends (with 10 to 40% TPU, preferably 20 to 25%).

In a preferred embodiment, the addition is made of LDPE (1 to 10%) to PC/PBT blends, which increases the impact strength and minimizes the molding shrinkage.

The addition of styrene maleic anhydride (SMA) to PC/PA6 blends (preferably PA6 with 50 to 80%, preferably 65 to 75%) results in an increase in the crystallization rate and therefore improved mechanical properties such as e.g. notch impact strength and elongation at failure.

These additions to polymers or polymer blends are described as "processing aids" according to the invention, as they improve the processing of the polymer blend according to the invention (for example, and without being restricted to that: increasing the crystallization rate, increasing the impact strength, improving the weld seam strength, reducing the molding shrinkage etc.).

Other preferred polymer blends for the frames according to the invention include polyolefin blends, such as PP/BR, PP/EPA, PP/EPDM, PP/PE, PP/PBT, PP/PET, PP/EPDM/CaCO$_3$ blends (with 5 to 40%, preferably 7 to 20%).

Preferably, in step (ii) of the method according to the invention, the addition of impact modifiers such as preferably ethylene propylene rubber (EPR, EPDM), acrylonitrile butadiene rubber (NBR), styrene butadiene styrene copolymer, statistic (SBR), styrene butadiene styrene block copolymer, statistic (SBS), styrene ethylene butylene styrene (SEBS), methyl methacrylate butadiene styrene copolymer (MBS), acrylic rubber (ACR), ethyl ethylene vinyl acetate rubber (EVA), ethylene acrylic acid copolymer (EAA), PE, melt processable rubber (MPR), natural rubber, chlorinated butyl rubber (CBR), polybutadiene rubber (BR), acrylonitrile (chlorinated polyethylene) styrene (ACS), chlorinated polyethylene (CPE), acrylonitrile butadiene styrene copolymer (ABS), styrene acrylonitrile copolymer (SAN), methyl methacrylate styrene copolymer (MMA/S copolymer), poly (methyl methacrylate) (PMMA), thermoplastic elastomer (TPE, e.g. TPOs [PP/EPDM elastomer, TPU/EVA elastomer]), polyisoprene (IR), high impact polystyrene (HIPS), ethylene propylene elastomer (EPA) or inorganic impact modifiers such as e.g. barium sulfate, fine potassium carbonate, kaolin or glass balls.

In a particularly preferred embodiment of the present invention, the at least one homopolymer or the at least one copolymer or the blend of these is elastomer-modified. To do this, preferably in step (ii) of the method according to the invention, at least one substance for elastomer modification is added to the at least one homopolymer or the at least one copolymer or to the blend of these.

Preferred media for the elastomer modification are: ethylene propylene diene rubber (EPDM), elastomer MAH graft copolymers, polyolefin elastomers (ethylene octene copolymer POE) grafted with MAH (maleic anhydride), styrene butadiene styrene copolymer grafted with MAH. The MAH ratio is preferably between 0.1 and 5%, preferably between 0.3 and 0.7%. Furthermore the ratio of the impact modifiers is preferably at least 5%, preferably between 5 and 20%.

Preferably the adhesion promoter is chosen from the following group: maleic acid anhydride, methyl methacrylic acid glycidyl methacrylate, acrylic acid, methacrylic acid, ethylene acrylic acid copolymer, ethylene methacrylic acid copolymer, styrene maleic acid anhydride, dibutyl maleate, maleic acid, styrene glycidyl methacrylate (SG) and glycidyl phenyl ether.

The percentage by weight of adhesion promoters to the grafted matrix polymer is 0.3 to 20%, preferably 3 to 10%.

According to an alternative to step (ii), the addition of flame retardants is preferred. Flame retardants can be roughly divided into phosphorus-free and phosphorus-containing flame retardants.

Preferred phosphorus-containing flame retardants are: bisphenol-A diphenyl phosphate, triphenyl phosphate, tricresyl phosphate, diphenyl cresyl phosphate, diphenyl octyl phosphate, tributyl phosphate, triphenyl phosphate, oligomeric resorcinol-BIS (diphenyl phosphate) (RDP), ammonium polyphosphate, red phosphorus, ammonium polyphosphate, trimethyl phosphate (TMP), O,O-diethyl-N,N-bis(2-hydroxyethyl)aminomethyl phosphonate, di(polyoxyethylene)-hydroxymethyl phosphonate (HMP), polyisocyanurate (PIR).

Preferred phosphorus-free flame retardants are: magnesium hydroxide, carbonate oligomers, alkali metal organosulfonates, ammonium octamolybdate (AOM), molybdenum oxide, aluminum hydroxide, co-metal oxides (e.g., MgO/ZnO, MoO$_3$/ZnO), barium metaborate, magnesium sulfate heptahydrate, antimony oxide, zinc borate, and calcium borate.

In a preferred embodiment in step (ii) of the method according to the invention, at least two classes of additives are deployed from all the possible additive classes, i.e. softeners, flame retardants, processing aids, and elastomer modifiers, but preferably three classes of additives and particularly preferably all of the four classes of additives, i.e. at least one softener, at least one flame retardant, at least one processing aid, and at least one elastomer modifier. In all of these embodiments the added quantity of additives is (by weight) between 0.5 and 40%, preferably between 4 and 17%.

The deployment of the polymer blend according to the invention for frame elements has the following advantages compared to the conventional polymers as they are known from the state of technology:
- it allows assembly of the frame elements by means of snap hook connections (assembly and dismantling-friendly method, therefore economical)
- low material and manufacturing costs
- weight reduction
- by the deployment of the polymer blends according to the invention: compliance with the required combustion behavior as well as the required service life for applications in the electrical vehicles section of the automotive industry
- by modification (processing aids) the plastic has a high toughness and elasticity.

Example of an Application

For the example of the polymer blend Grilon TS V0 (a polymer blend containing PA6 and PA6.6), it is shown below that frame elements made by means of the method according to the invention fulfill in a particular way the requirements for electrochemical energy storage units with high power density.

1. Dimensional Stability Under Heat/Flammability

If during short term heat exposure a certain temperature limit is exceeded, the intermolecular forces between the polymer chains are reduced, the molecule chains slip more easily past each other and the thermoplastic material starts flowing. In order to investigate the dimensional stability under heat, a test battery was made. For this, instead of Li-ion cells, metal plates of the same weight (330 g) were clamped into the frame elements. This test setup was then placed into an oven onto two bars for over 24 hours at 90° C. in order to test the dimensional stability under heat.

By means of comparing the dimensions before and after the 24 hours, it could be determined that the frame continued to be stable and had not warped.

In addition, it was found during a flammability test that the frame elements made according to the invention will eventually melt if exposed to the flame of a Bunsen burner, but they will not burn. In particular, no burning drops fall off.

2. Strength Test

The strength of the frame was investigated using the Dynstat method. The Dynstat method is advantageous, because small sample sizes (such as length=15±1, width=10±0.5 and thickness 1.2 to 4.5 mm) can be taken from the workpiece and tested. In this way samples can be made even from complex components which have no large, level surfaces.

Figure 1:
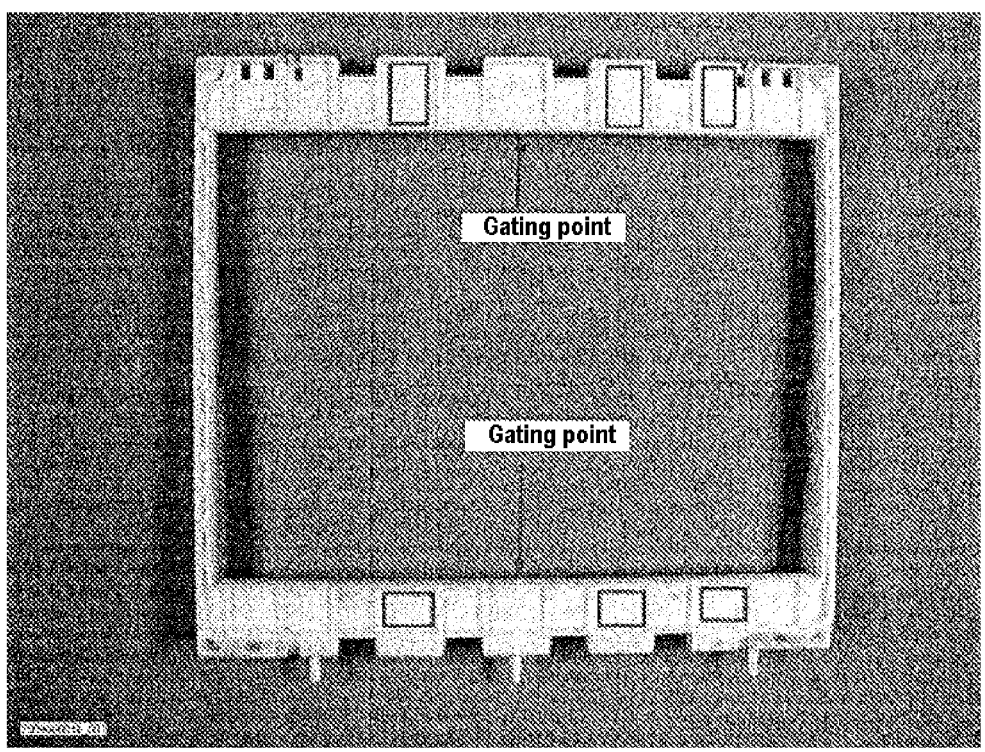
FIG. 1 depicts a frame element according to an embodiment of the application.

FIG. 1 shows a frame element made using the method according to the invention for an electrochemical cell (material: the PA6 and PA6.6 polymer blend mentioned above). FIG. 1 also shows the location of the samples in the frame. The upper three samples are located perpendicular to the flow direction and the lower three samples in parallel to the flow direction.

Here the following values for the impact strength (first table) and the flexural strength (second table) were found (n.f.—no failure):

| No. | Width [mm] | Thickness [mm] | $A_n$ [kpcm] | $a_n$ [kJ/m$^2$] | Sample orientation |
|---|---|---|---|---|---|
| 1 | 10.07 | 1.58 | — | n.f. | parallel |
| 2 | 10.08 | 1.50 | — | n.f. | parallel |
| 3 | 10.10 | 1.59 | — | n.f. | parallel |
| 4 | 10.03 | 1.49 | — | n.f. | parallel |
| 5 | 10.14 | 1.51 | — | n.f. | parallel |
| 6 | 10.04 | 1.48 | — | n.f. | perpendicular |
| 7 | 10.09 | 1.50 | — | n.f. | perpendicular |
| 8 | 10.14 | 1.52 | — | n.f. | perpendicular |
| 9 | 10.30 | 1.45 | — | n.f. | perpendicular |
| 10 | 10.01 | 1.49 | — | n.f. | perpendicular |

| No. | Width [mm] | Thickness [mm] | M [kpcm] | [N/mm$^2$] | Sample orientation |
|---|---|---|---|---|---|
| 1 | 10.16 | 1.44 | 3.1 | 86.6 | parallel |
| 2 | 10.06 | 1.44 | 3.2 | 86.5 | parallel |
| 3 | 10.12 | 1.52 | 3.3 | 93.1 | parallel |
| 4 | 10.08 | 1.55 | 3.4 | 90.0 | parallel |
| 5 | 10.10 | 1.49 | 3.4 | 89.2 | parallel |
| 6 | 10.13 | 1.55 | 3.2 | 82.5 | perpendicular |
| 7 | 10.08 | 1.58 | 3.2 | 80.6 | perpendicular |
| 8 | 10.08 | 1.47 | 3.4 | 82.6 | perpendicular |
| 9 | 10.15 | 1.50 | 3.5 | 84.6 | perpendicular |
| 10 | 10.02 | 1.49 | 3.3 | 77.2 | perpendicular |

| Statistics | Sample body total | Parallel | Perpendicular |
|---|---|---|---|
| n | 10 | 5 | 5 |
| x | 85.29 | 89.08 | 81.50 |
| s | 4.77 | 2.73 | 2.79 |
| v | 5.59 | 3.07 | 3.42 |

These measurements show therefore that the polymer blend according to the present invention is particularly suitable for the electrochemical energy storage devices.

3. Investigation of Aging

Here the durability of the activation energy of the frame elements was investigated.

The aging of the polymer of the frame was computed based on an investigation by means of thermogravimetric analysis (TGA). For this only the influence of thermal aging was investigated. Other influences, such as the influences from the environment, UV light etc. were ignored.

Figure 2:
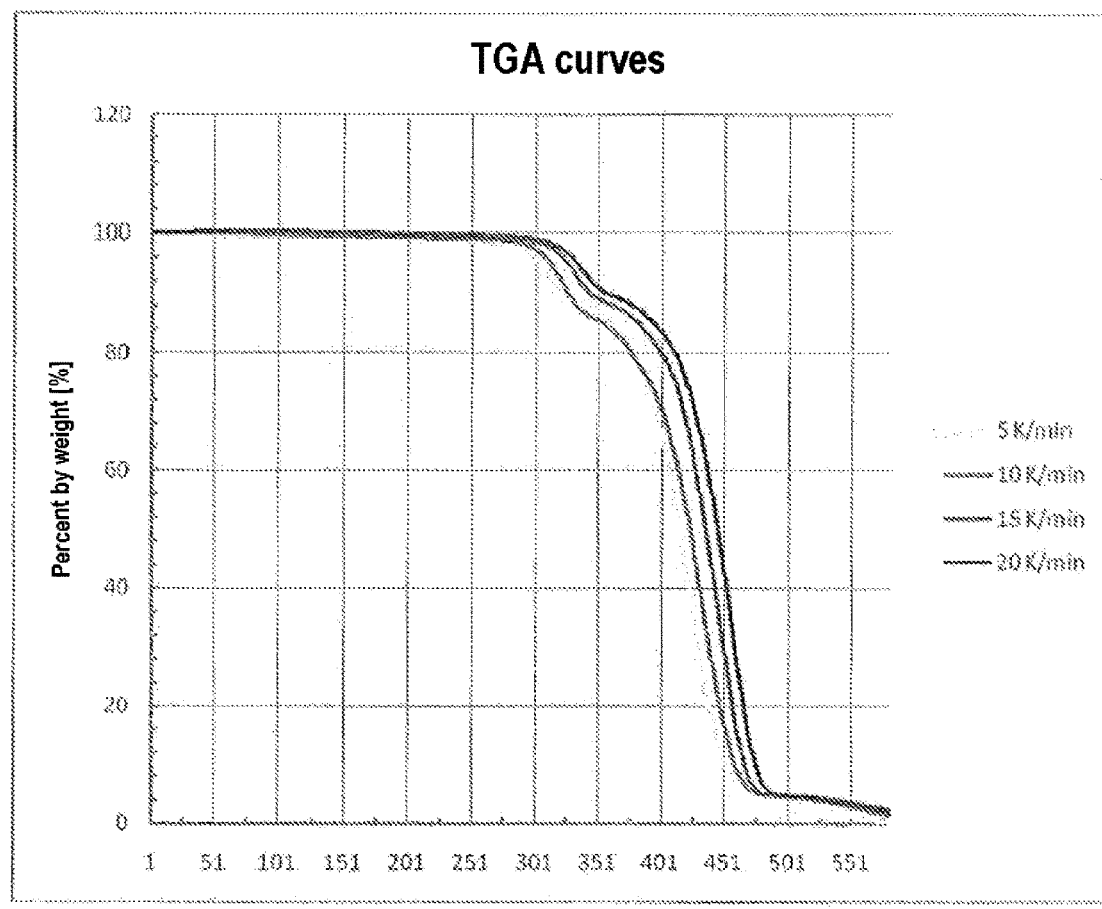
FIG. 2 depicts a thermogravimetric analysis (TGA) of a frame element according to an embodiment of the application.

The TGA was carried out with four different heating rates (5, 10, 15 and 20 K/min) exposed to air with a sample size of about 10 mg. FIG. 2 shows the four TGA curves.

From the TGA curves, two points of inflection can be determined. The first is between 300 and 350° C., the second between 400 and 470° C.

In the area of the first point of inflection there is a weight loss of between 9 and 15%, at the second the loss is between 40 and 70%.

| | Point of inflection of the weight change | |
|---|---|---|
| | 1 | 2 |
| Decomposition temperature [° C.] | 300 to 350 | 400 to 470 |
| Weight loss [%] | approx. 9 to 12 | approx. 40 to 70 |

Up to a weight loss of approx. 10 to 12% the mechanical properties do not seriously change, so the plastic material Grilon TS V0 in the deployment range from 40 to 60° C. can be used with advantage for frame elements in electrochemical energy storage units, even if cells held in the frame warm up significantly. This is particularly relevant as the available tests also indicate suitability as frame elements for electrochemical energy storage units when the cells to be supported by the frame are relatively heavy and are prone to release heat energy.

The durability is calculated from the kinetic equation (based on Arrhenius' equation) for the thermal decomposition reaction, and these results are used to calculate the service life as is shown in the table below.

By means of the TGA curves, the relationship between temperature and weight loss can be determined. From this, the activation energy can be calculated. For the Grilon ST V0 polymer blend it is 101.617 kJ/mol. By means of the activation energy the durability of the polymer can be determined for any operating temperature:

| Service life $t_f$ [years] | Operating temperature [° C.] |
|---|---|
| 90.26 | 40 |
| 48.88 | 45 |
| 26.97 | 50 |
| 15.16 | 55 |
| 8.67 | 60 |
| 5.04 | 65 |
| 2.98 | 70 |
| 1.78 | 75 |
| 1.09 | 80 |
| 0.67 | 85 |
| 0.42 | 90 |
| 0.26 | 95 |
| 0.17 | 100 |

A service life of more than eight for a temperature of 60° C. is to be regarded as advantageous for the intended application.

The invention claimed is:

1. A method for the manufacturing frame elements for frames for electrochemical energy storage units, wherein the method comprises the following steps:
   (i) providing a polymer selected from the group consisting of a homopolymer, a copolymer, and mixtures thereof;
   (ii) adding to the polymer at least one additive selected from the group consisting of softeners, flame retardants, processing aids, and elastomer modifiers to obtain a polymer blend;
   (iii) injection molding the polymer blend to manufacture a frame element,
   wherein the polymer blend has a specific thermal conductivity of more than 1 W/(m K), wherein the polymer blend obtained in step (ii) includes
   (a) mixtures of PC, PP, PBT, and PET with elastomer modified phases, and
   (b) mixtures (blends or polymer alloys) comprising PA6/PA66 blends with 10 to 40% PA66, PA6/PA66/PA12 tri-blends, PA6/PA1010 blends, PA6/PA12 blends, or PA1010/PA12 blends,
   wherein the frame element has a specific resistance of more than 1 Ωm (at 20° C.).

2. The method as claimed in claim 1, wherein the HDT/B value of the frame element is 50° C. to 200° C. (ISO 75).

3. The method as claimed in claim 1, wherein an elastomer is added to the polymer during step (ii).

4. The method as claimed in claim 1, wherein the homopolymer of step (i) is selected from the group consisting of polyamide (PA), thermoplastic polyurethane (PU), polyester, polyoxymethylene (POM), polyphenylene oxide (PPO), polyphenyl sulfide (PPS), polyimide (PI), and polybutylene terephthalate (PBT).

5. The method as claimed in claim 1, wherein the copolymer of step (i) is selected from the group consisting of PA 6/12, PA 66/6, PA 66/610 or PA 12/6/66 copolymers, wherein the PA 66/6 copolymers include copolymers where the polyamide is polymerized by the simultaneous polycondensation of PA66 and PA6 blocks, with the ratio of the PA66 blocks being in the range of 10 to 80% by weight.

6. The method as claimed in claim 1, wherein the polymer blends obtained in step (ii) include
   mixtures (blends or polymer alloys) comprising PA6/PA66 blends with 10 to 40% PA66, PA6/PA66/PA12 tri-blends, PA6/PA1010 blends, PA6/PA12 blends, or PA1010/PA12 blends.

7. The method as claimed in claim 1, wherein the at least one homopolymer or the at least one copolymer or the mixture of these contains at least one elastomer-modified polyamide.

8. The method as claimed in claim 1, wherein the at least one homopolymer or the at least one copolymer or the mixture of these contains at least one block copolymer.

9. The method as claimed in claim 1, wherein the at least one homopolymer or the at least one copolymer or the mixture of these contains mixtures of PA/polyethylene blends, blends of PA6, PA12 or PA66 with polyphenyl ether, PA/ABS blends, PA/polyphenylene sulfide blends, or PA6/PET blends.

10. The method as claimed in claim 1, wherein the at least one homopolymer or the at least one copolymer or the mixture of these contains PC/ABS blends, PC/PE blends, PC/PET blends or PC/PS blends.

11. The method as claimed in claim 1, wherein the electrochemical energy storage unit includes a lithium-ion battery.

12. The method as claimed in claim 1, wherein the electrochemical energy storage unit has a power density of more than 100 W/kg.

13. The method as claimed in claim 1, wherein the frame element is electrically non-conducting or badly conducting and preferably has a specific resistance of more than $10^{20}$ Ωm (at 20° C.).

14. The method as claimed in claim 1, wherein the HDT/B value of the frame element is 80° C. to 200° C. (ISO 75).

15. The method as claimed in claim 1, wherein the electrochemical energy storage unit has a power density of more than 2000 W/kg.

16. The method as claimed in claim 1, wherein the polymer in step (i) is a PA6/PA66 polymer blend or copolymer with 25 to 35% PA66.

* * * * *